Figure 2:
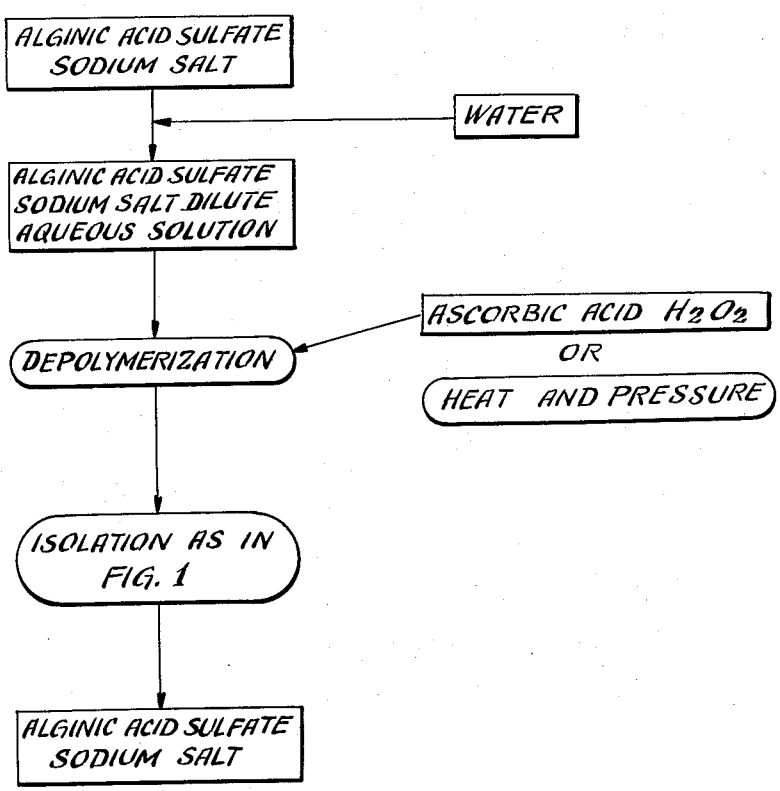

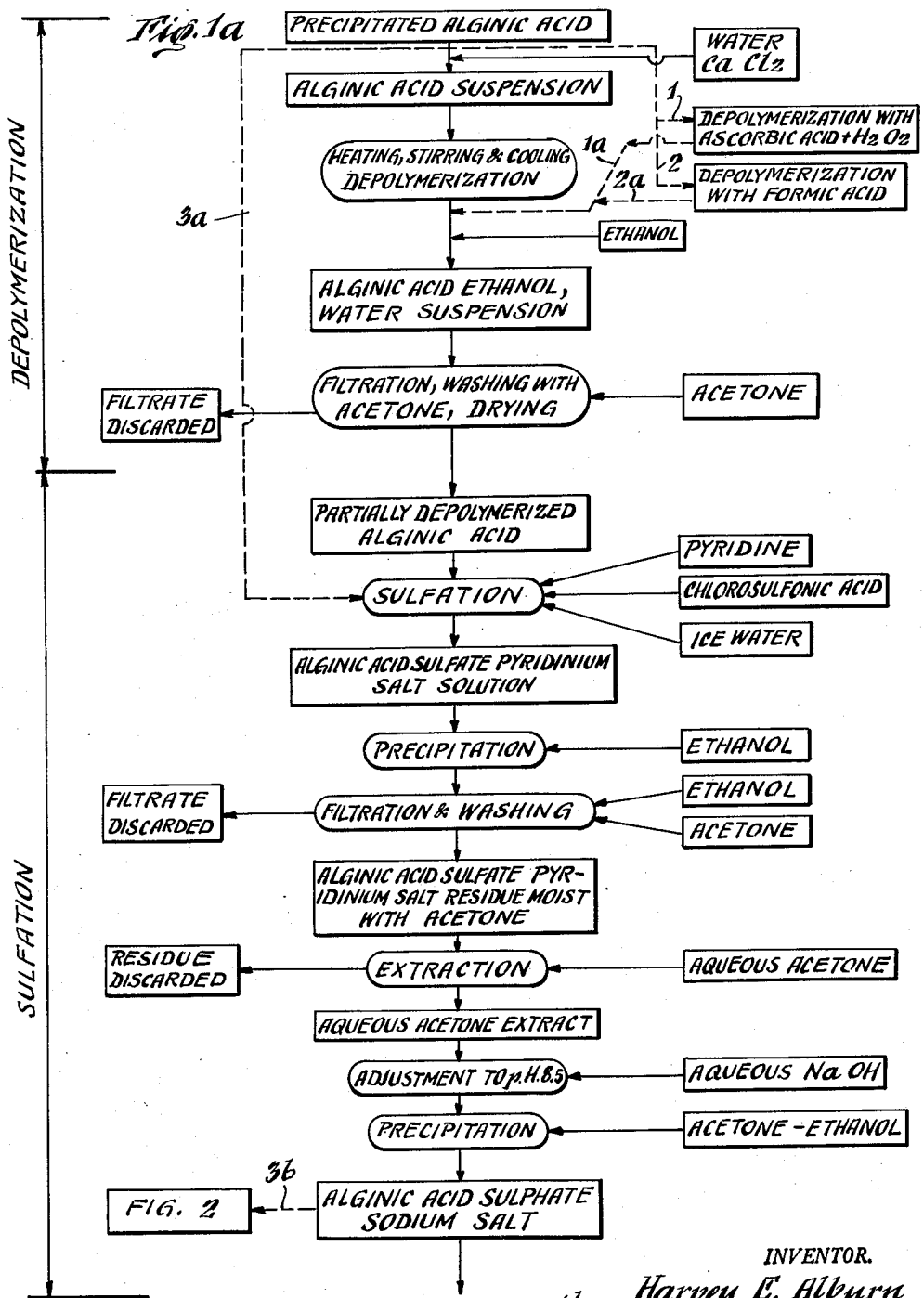
May 12, 1953     H. E. ALBURN     2,638,469
PROCESS FOR ALGINIC ACID SULFATE PRODUCTION
Filed May 19, 1950     3 Sheets-Sheet 1
INVENTOR.
Harvey E. Alburn
BY Marston L. Hamlin
ATTORNEY

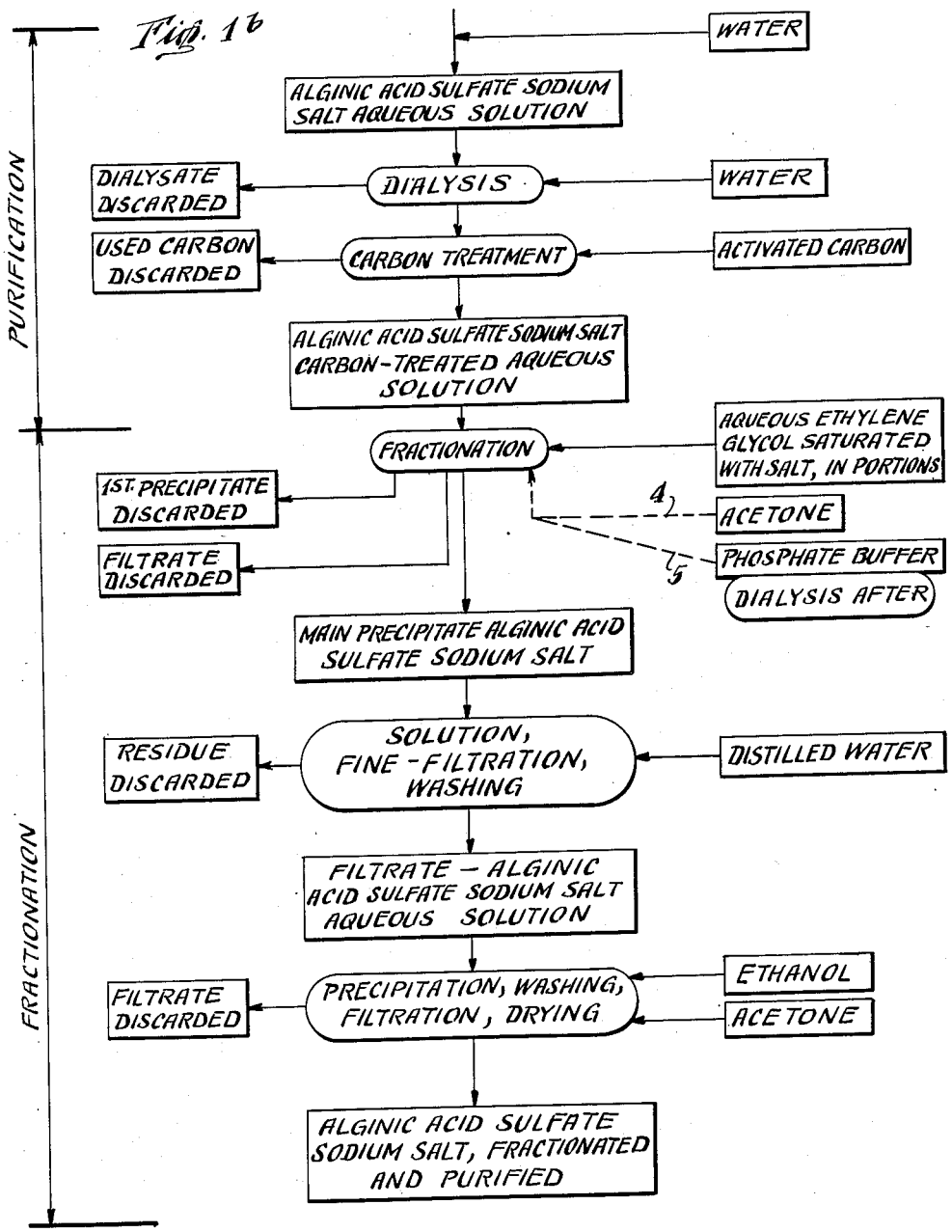

May 12, 1953 H. E. ALBURN 2,638,469
PROCESS FOR ALGINIC ACID SULFATE PRODUCTION
Filed May 19, 1950 3 Sheets-Sheet 3

INVENTOR.
Harvey E. Alburn
BY
Marston L. Hamlin
ATTORNEY

Patented May 12, 1953

2,638,469

UNITED STATES PATENT OFFICE 2,638,469

PROCESS FOR ALGINIC ACID SULFATE PRODUCTION

Harvey E. Alburn, Philadelphia, Pa., assignor, by mesne assignments, to American Home Products Corporation, New York, N. Y., a corporation of Delaware Application May 19, 1950, Serial No. 163,073

8 Claims. (Cl. 260—209.6)

This invention relates to improvements in alginic acid sulfate production.

In copending patent application Serial No. 703,463, filed October 16, 1946, by Eric G. Snyder, for Alginic Acid Sulfate Anti-Coagulant, now U. S. Patent 2,508,433, a process is disclosed for producing alginic acid sulfate and its salts for use as a blood anti-coagulant. This process involves precipitating and drying commercial alginic acid, sulfating it under substantially anhydrous conditions with a sulfating agent such as chlorosulfonic acid in the presence of an acid acceptor such as pyridine, and recovering the desired salt, e. g. the sodium salt, from the sulfation mixture.

Alginic acid and its derivatives are polymeric materials, and, like most such materials, contain molecules of differing degrees of polymerization. In a material of a given average molecular weight molecular species of both lower and higher molecular weight will be present in varying ratios, depending on the starting material and on the conditions of sulfation. In this application when alginic acid, alginic acid sulfate or their salts are mentioned, these terms are intended to include such assemblages of molecular species of various degrees of polymerization.

Since molecules of varying molecular weight appear to have varying physiological effect, variations in molecular weight distribution in production batches result in rejection of such batches from time to time, when tested for activity and toxicity, owing to an undesirably high content of relatively more toxic high-polymer material and relatively inactive low-polymer material.

I have discovered that greatly improved constancy of product having a satisfactory ratio of therapeutic to toxic dosage can be attained by my improved process in which the molecular weight distribution is limited and controlled.

According to my invention I introduce a partial depolymerizing or degrading step into the process, controlling the depolymerization by viscosity or other molecular weight determinations, e. g. sedimentation rate or copper reduction, and preferably fractionate the partially depolymerized product by selective extraction or precipitation with suitable solvents; I also find it advantageous to introduce a dialyzing step into the process after sulfation to remove soluble inorganic salts and low-molecular-weight alginic acid sulfate. In this disclosure, for the sake of simplicity, I use the term alginic acid sulfate in a broad sense to include both the sulfate ester and its soluble salts, except as otherwise indicated.

The partial depolymerization may be carried out before or after sulfation.

While some of the advantages of my invention may be realized without employing the extraction, fractionation and dialysis steps, best results are secured when these steps are practised.

A preferred operation, therefore, may comprise: (1) partial depolymerization of alginic acid, (2) sulfation of the degraded product, (3) extraction, (4) dialysis, and (5) fractionation of the resulting alginic acid sulfate.

Alternatively, as pointed out above, the alginic acid may first be sulfated and the resulting alginic acid sulfate partially depolymerized.

The alginic acid may be made from the edible grade of sodium alginate by dissolution in about 75 parts of water, precipitation by about 1.6 parts of 1:1 hydrochloric acid, washing with water to pH 2.5–3.0 and air drying.

I can depolymerize it to the desired degree in various ways—for example, by heating moist commercial alginic acid, by treating an aqueous solution of sodium alginate with ascorbic acid and slowly adding hydrogen peroxide, by heating a suspension of alginic acid in 90% formic acid, or by refluxing moist alginic acid suspended in pyridine. The simplest and preferred method, however, is to heat a suspension of alginic acid in water (preferably containing a small amount of dissolved calcium chloride or other activating agent such as hydrochloric or boric acid) at or near the boiling point until the desired reduction in viscosity is achieved. A satisfactory final viscosity may, for example, be in the range 1.3–1.6 centipoises for a 1% solution of alginic acid in 0.1 N NaOH at 30° C.

I then sulfate the partially depolymerized alginic acid. I can accomplish this by treating a suspension of dry alginic acid in methanol, preferably at a low temperature, e. g. —15° to 35° C., with concentrated sulfuric acid, and isolating the alginic acid sulfate, e. g. as the sodium salt, from the sulfation mixture; or I can use a method based on the disclosure of the above cited Snyder application, viz. add partially depolymerized alginic acid to a cooled mixture of chlorosulfonic acid and dry pyridine, and isolate the alginic acid sulfate from the sulfation mixture in the form of a desired soluble salt. For example, the crude pyridinium salt can be precipitated from aqueous solution with ethanol and dissolved in aqueous acetone; the solution can then be adjusted to a pH in the range 7–9, preferably to pH 8.5, with sodium hydroxide and the sodium salt of the sulfate ester precipitated with ethanol. The ammonium and potassium salts, like the sodium salt, are soluble in water, the calcium salt somewhat less so. Heavy metal salts are still less soluble. They may be prepared by suitable neutralization or double decomposition methods.

The thus prepared sodium salt will contain a smaller percentage of molecules of excessively high molecular weight and will run more uniform from batch to batch than a product made without the partial depolymerization step. Further improvement in uniformity, molecular weight distribution and physiological properties can, however, be effected by fractionation, e. g. by fractional extraction or fractional precipitation. This can be carried out in several ways. Fractional extraction may, for example, be carried out by digesting the crude pyridinium salt at room temperature with a selective solvent, such as aqueous acetone. The desired material dissolves, while some unsulfated alginic acid and some high-polymer material remain in the residue, which is discarded. In fractional precipitation acetone may be added in portions to a dilute aqueous solution of the sodium salt of alginic acid sulfate, preferably containing dissolved sodium chloride; the first precipitate formed and separately collected is more toxic than later precipitates. Or the sulfate ester or its sodium salt can be mixed with a suitable salt solution, such as aqueous half-saturated disodium phosphate; a more toxic fraction remains undissolved and a suitable fraction may be recovered from the solution. I have, however, found the most effective fractionating agent to be aqueous ethylene glycol, e. g. ethylene glycol : water : : 9:1, containing a dissolved salt such as sodium chloride. Such a solution, added in suitable amounts to an aqueous solution of a soluble salt of the sulfate ester, will first precipitate a higher-molecular-weight more toxic fraction, say about 10% of the whole, which is separated and discarded; further addition of the ethylene glycol precipitant will precipitate a middle fraction, say 50-60% of the whole, which is collected, and the remainder discarded. The collected fraction will have a desirable anti-coagulant-toxicity ratio and an extremely low content of very high- and very low-molecular-weight material. Other reagents may be used for fractionation. These are the lower aliphatic oxygen-containing neutral compounds, such as alcohols, ketones and ethers which have a high solubility in water and little solvent power for alginic acid sulfate. Examples are methanol, Cellosolve, methyl-cellosolve, butanol and isopropanol.

Alternatively, I can first sulfate the alginic acid and then partially depolymerize or degrade the resulting sulfate ester, usually in the form of a soluble salt such as the sodium salt. This may be accomplished by treating a dilute aqueous solution with ascorbic acid and hydrogen peroxide, or by autoclaving a dilute solution, say 1-2%, e. g. at around 120° C. for ½-2 hours.

Such a degradation step is then advantageously followed by a fractionation step as described above.

In the course of the preparation ethanol is the preferred precipitant of sulfate ester salts from aqueous solutions though other lower alcohols, acetone, methylethyl ketone, dioxane and the like, may be used. Excess soluble inorganic salts can be removed at appropriate points by dialysis.

The final product, the sodium salt of alginic acid sulfate, is tested for anti-coagulant effect on rabbits and for toxicity on mice. A satisfactory product conforms to all the tests for heparin in new and non-official remedies, 1949, page 620, except that it gives no test for nitrogen, which is absent from the molecule. The viscosity of the product in 1% aqueous solution lies preferably in the range 1.04–1.12 centipoises (Ostwald-Fenske pipette at 30° C.).

The preferred product of my process chemically appears to be a sodium salt of a sulfuric acid ester of polyanhydromannuronic acid, containing at least one sulfuric acid residue per mannuronic acid residue. Its sulfur content is approximately 11–13% and its sodium content approximately 11.6–12.6% when isolated from aqueous solution at about pH 7.5; for example, the analysis of one sample isolated at pH 7.5 was Sulfur: 11.82%
Sodium: 11.63%

This analytical range suggests that my preferred product, isolated at or near pH 7.5, consists predominantly of molecular species containing lactone rings in alternate mannuronic acid units, as for example:

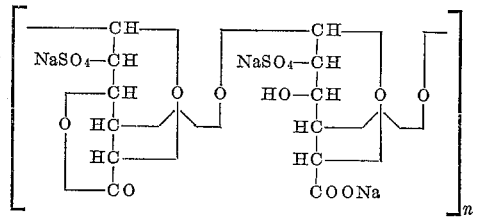

This formula contains:

Sulfur: 11.45%
Sodium: 12.32%

If the solution, from which the sulfate ester salt is isolated, as by precipitation with ethanol or by freeze-drying, is made increasingly alkaline, the sodium content of the product rises; at pH 11.6 the sodium content is approximately 15.5%, corresponding closely to that of a disodium salt in which the lactone rings are broken:

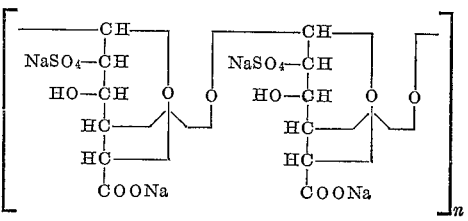

The calculated sodium content for this formula is 15.32%. The sulfur content of the product isolated from this more alkaline solution drops slightly; one sample, for example, contained 11.40% sulfur. This is about 0.7% more sulfur than the 10.68% calculated for the last above noted formula. In the case of both the mono- and disodium salts, the sulfur content found is consistently slightly higher than the above calculated figures. This may be accounted for by the probable presence of an extra sulfate group at one end of such polymer chain.

In the drawings Fig. 1 is a flow sheet of one embodiment of my process and Fig. 2 is a flow sheet of another embodiment of my process. Both are largely self-explanatory. Square boxes represent materials and rounded boxes processes. Solid lines with arrow heads indicate the flow of materials. Materials entering the process are shown at the right and those leaving the process at the left. Dashed lines indicate alternative operations. Dashed lines 1 and 1a indicate depolymerization with ascorbic acid instead of by heating; similarly dashed lines 2 and 2a indicate repolymerization with formic acid. Dashed lines 3a and 3b indicate an alternative route in which depolymerization follows sulfation, further details being indicated in Fig. 2. Dashed lines 4 and 5 indicate alternative methods of fractionation.

Examples of the practise of my invention and of testing the resulting products follow; these are to be taken as illustrative only and not as limiting my invention, the scope of which is defined in the appended claims.

*Example I*

Alginic acid made from algin, as described above, is tested for suitability for use. It should contain less than 15% volatile matter and less than 3% ash; its solubility should be such that a 1% solution at pH 7.5 should be clear to insure the exclusion of uncarboxylated polysaccharides. Samples of the alginic acid are suspended in water and heated for various times at 100° C. to determine the heating time necessary to reduce the viscosity to about 1.3 centipoises for a 1% solution in 0.1 N NaOH at 30° C.

In the following description parts are expressed in metric units.

To partially depolymerize the alginic acid to the desired molecular weight range, 1 part by weight of alginic acid is suspended in 7 parts by volume of water containing 0.05 part by weight of calcium chloride, and the mixture is stirred at 100° C. for the previously determined time. The mixture is cooled, mixed with an equal volume of 95% denatured ethanol and the alginic acid filtered off. It is washed with acetone and oven-dried below 60° C. Moisture content should be under 10%, and viscosity should be 1.3 to 1.4 centipoises for a 1% solution in 0.1 N NaOH on a dry weight basis as determined in an Ostwald-Fenske pipette at 30° C. and pH 7.0.

Nineteen parts by volume of pyridine (2° grade containing less than 0.4% water) are placed in a jacketed vessel ventilated with dry nitrogen and 4.67 parts by volume of chlorosulfonic acid are added with cooling. With the temperature under 6° C., 1 part by weight of degraded alginic acid is added and the mixture stirred at 77±1° for 1 hour. The hot mixture is poured into 35 parts by volume of cracked ice and stirred until a clear solution is obtained. The crude pyridinium salt of alginic acid sulfate is then precipitated by stirring this solution into 4 times its volume of 95% denatured ethanol. The precipitate is then washed with 1.5 times the aqueous volume of ethanol and 3 times the aqueous volume of acetone. The excess acetone is removed and the damp precipitate is stored in a closed vessel until the water content (determined by distillation with xylene) and acetone content (total volatile matter minus water) have been determined. Then the precipitate is extracted with 12 parts by volume per part by weight of dry solids of 1:1 (volume/volume) aqueous acetone, allowance being made for the amounts of acetone and water already in the precipitate. The extraction is made by stirring vigorously for 2 hours in a closed vessel at room temperature.

The residue is centrifuged off and the supernatant solution is adjusted to pH 8.5, first with 50% and then with 5% sodium hydroxide solutions, thereby converting the pyridinium salt to the sodium salt. The solution is then mixed with 4 times its volume of 1:1 (volume/volume) ethanol-acetone, and the resulting precipitate filtered off and dissolved in water to make an approximately 10% solution. The solution is dialyzed for 16 hours in a counter-current dialyzer, then reconcentrated in vacuo at under 50° C. to an approximately 10% concentration. The solution is then stirred for 30 minutes with 250 grams per liter of activated carbon ("Norit" A), and the carbon is filtered off with a filter aid such as "Super Cel."

A sample of this solution is put through a bacterial filter and solids are determined at 105° C. On the basis of the solids content, the solution is assayed for anti-coagulant activity in rabbits and for toxicity in mice. On the basis of these assays, the lot is then fractionated in the following manner. The solution is stirred and a solution of 9:1 ethylene glycol-water (volume/volume) saturated with sodium chloride (NaCl content 7.4%) is added slowly. To determine the amount precipitated, samples are taken out at intervals, centrifuged, and the precipitate washed with ethanol and acetone and dried. About 10% of the solids, i. e. the higher molecular weight material, is precipitated first and discarded. Then 50-60% of the solids is precipitated as the usable fraction and the balance, lower molecular weight material, is discarded. The middle fraction, after collection by filtration, is dissolved in distilled water to make an approximately 10% solution and filtered through asbestos pads of very fine porosity (Republic #S-1) to remove all particulate matter, and the alginic acid sulfate sodium salt is precipitated with 4 volumes of 95% denatured ethanol. The precipitate is washed with twice the aqueous volume of ethanol and 4 times each with the aqueous volume of acetone. The acetone is filtered off and the product dried in a steam oven at 50° for 16 hours. The yield is about 35 grams per 100 grams of degraded alginic acid. The moisture varies from 5 to 12%, determined at 105° for 16 hours. The content of the samples used for activity, toxicity and all other tests is calculated on a moisture-free basis.

By the use of this method alginic acid sulfate sodium salt can be produced with reasonable consistency and constancy, having an $LD_{50}$ of 1200 to 1400 mg./kg. with mice, and giving an elevated clotting time of 4 to 5 hours at a dosage of 5 mg./kg. in rabbits.

*Example II*

A solution was made up at 25° C. containing 0.25% sodium alginate, M/15 sodium phosphate buffer, M/100 ascorbic acid and 0.0017 M hydrogen peroxide and the viscosities determined as described above at a series of time intervals as follows:

| Time in minutes | 0 | 4 | 10 |
|---|---|---|---|
| Viscosity in centipoises | 2.25 (approx.) | 1.13 | 1.05 |

These viscosities are lower than the criterion specified above because of the lower alginic acid concentration. The thus partially depolymerized alginic acid was adapted to be sulfated and further processed as in Example I.

*Example III*

Four hundred and twenty-five grams of alginic acid having a viscosity of 3.9 centipoises (0.4% solution at pH 8 and 30° C.) were suspended in 2400 ml. 90% formic acid and heated at 80° C. for 90 minutes. The mixture was cooled and centrifuged. The residue was washed twice with 50% denatured ethanol, three times with 95% denatured ethanol, once with acetone and twice with ether. It was dried in vacuo at 60° C. The viscosity of a 0.4% solution in M/15 sodium phosphate buffer at pH 7 and 30° C. was 1.15 centipoises. This falls within the above given preferred range for a 1% solution in 0.1 N NaOH. This material was suitable for sulfation and further processing as in Example I.

*Example IV*

To test the anti-coagulant effect of products of my process produced as in Example I, rabbits were given an intravenous injection of 5 mg./kg. body weight after determining the normal clotting time of the blood of each rabbit. Samples of blood were then withdrawn from each rabbit at successive 30 minute intervals, and the time noted which was required for the clotting time to return to normal. To determine toxicity, mice were injected with respectively 1000, 1200 and 1400 mg./kg. of body weight and the dosage noted which would kill half the mice.

In a typical test the average duration of elevated clotting time in 3 rabbits was 300 minutes; the $LD_{50}$ in mice was 1200 mg./kg. In another test the duration of elevated clotting time was 270 minutes and the $LD_{50}$ was 1400 mg./kg.

I claim:

1. In a process of producing an alginic acid sulfate composition having a restricted content of very high-polymer and very low-polymer molecular species, in which process alginic acid is sulfated, the improved steps which comprise: prior to sulfation partially depolymerizing alginic acid by exposing it to a liquid depolymerizing medium containing at least a small amount of water at a temperature in the approximate range 25°–115° C. for a time sufficient to substantially reduce the viscosity of an aqueous solution of a sodium salt thereof, isolating the partially depolymerized alginic acid, sulfating the so isolated alginic acid to form a sulfate ester, forming a water-soluble salt of the ester, and fractionating the salt by selective precipitation from aqueous solution by means of a neutral oxygen-containing organic liquid precipitant miscible with water, discarding a first fractional precipitate and collecting a middle fraction, whereby a salt is obtained having a restricted content of very high-polymer and very low-polymer molecular species, a high blood-anti-coagulant effect and low toxicity.

2. The steps defined in claim 1 in which partial depolymerization is effected by heating the alginic acid in aqueous suspension.

3. The steps defined in claim 1 in which partial depolymerization is effected by treating an aqueous solution of a soluble metal salt of alginic acid with ascorbic acid and hydrogen peroxide.

4. The steps defined in claim 1 in which partial depolymerization is effected by heating a suspension of alginic acid in concentrated formic acid.

5. The steps defined in claim 1 in which the salt is the sodium salt and the selective precipitant is aqueous ethylene glycol containing dissolved sodium chloride.

6. The process of producing an alginic acid sulfate composition having a restricted content of very high-polymer molecular species which comprises the following combination of steps: suspending alginic acid in water, heating the resulting suspension until a sample of alginic acid taken from the suspension shows a viscosity in the form of its sodium salt in a 1% aqueous solution at 30° C. in the range 1.05–1.6 centipoises, cooling the suspension, separating the thus partially depolymerized alginic acid from the suspension, sulfating the separated alginic acid, converting the sulfated product to a water-soluble salt of alginic acid sulfate, fractionating the water-soluble salt by dissolving it in water, selectively precipitating successive fractions from the aqueous solution by adding a water miscible oxygen-containing organic precipitant in portions, separating and rejecting a first minor high-polymer fraction and thereafter separately collecting a major intermediate fraction of the soluble salt whereby the intermediate fraction contains at most a restricted amount of a very high-polymer and very low-polymer molecular species and has a high blood-anti-coagulant effect and low toxicity.

7. The process of claim 6 in which sulfation is effected by chlorosulfonic acid in the presence of pyridine and the resulting pyridinium salt of alginic acid sulfate is precipitated and then selectively extracted with a restricted amount of aqueous acetone.

8. The process of producing the sodium salt of alginic acid sulfate in a form having a restricted content of very high-polymer and very low-polymer molecular species which comprises the following combination of steps: suspending alginic acid in about 7 parts of water containing 5% calcium chloride, heating the suspension in the neighborhood of 100° C. until a sample of the alginic acid taken from the suspension shows a viscosity as the sodium salt in a neutral 1% aqueous solution of 30° C. of approximately 1.1–1.4 centipoises, cooling the suspension, mixing it with an equal volume of ethanol, filtering off the precipitated alginic acid, washing it with acetone and drying it, sulfating the dried alginic acid by stirring it in a mixture of dry pyridine and chlorosulfonic acid in an approximate temperature range of 65°–80° C., quenching the sulfation mixture in cracked ice, precipitating and separating the crude pyridinium salt of the sulfate ester by the addition of ethanol to the resulting aqueous solution, extracting the precipitated salt with aqueous acetone, converting the dissolved pyridinium salt to the sodium salt by adding aqueous sodium hydroxide to the extract to approximately pH 8.5, precipitating and separating the sodium salt with an ethanol-acetone mixture, redissolving the sodium salt in water and dialyzing the solution, reconcentrating the dialyzed solution, fractionally precipitating from the solution a minor fraction of high-polymer material by adding to the solution a portion of aqueous ethylene glycol containing dissolved sodium chloride, and thereafter fractionally precipitating from the solution and separately collecting a major fraction of material of restricted high- and low-polymer content by adding a further portion of said ethylene glycol precipitant to the solution.

HARVEY E. ALBURN.

References Cited in the file of this patent

UNITED STATES PATENTS

| Number | Name | Date |
|---|---|---|
| 2,508,433 | Snyder | May 23, 1950 |

FOREIGN PATENTS

| Number | Country | Date |
|---|---|---|
| 603,571 | Great Britain | June 18, 1948 |

OTHER REFERENCES

Snellman et al., Chem. Abs. v. 44 (1950), 1227–b, 1 page.